No. 874,449. PATENTED DEC. 24, 1907.
W. T. SOLOMON.
GAS AND VAPOR BURNER.
APPLICATION FILED JAN. 30, 1907.

3 SHEETS—SHEET 1.

WITNESSES.

INVENTOR.

No. 874,449.

PATENTED DEC. 24, 1907.

W. T. SOLOMON.
GAS AND VAPOR BURNER.
APPLICATION FILED JAN. 30, 1907.

3 SHEETS—SHEET 2.

WITNESSES.

INVENTOR.

No. 874,449. PATENTED DEC. 24, 1907.
W. T. SOLOMON.
GAS AND VAPOR BURNER.
APPLICATION FILED JAN. 30, 1907.

3 SHEETS—SHEET 3.

WITNESSES.
M. A. Keller

INVENTOR.
William T. Solomon
by James K. Bakewell
his attorney

UNITED STATES PATENT OFFICE.

WILLIAM T. SOLOMON, OF PITTSBURG, PENNSYLVANIA, ASSIGNOR TO ROBERT C. HALL, OF PITTSBURG, PENNSYLVANIA.

GAS AND VAPOR BURNER.

No. 874,449.  Specification of Letters Patent.  Patented Dec. 24, 1907.

Application filed January 30, 1907. Serial No. 354,913.

*To all whom it may concern:*

Be it known that I, WILLIAM T. SOLOMON, of Pittsburg, in the county of Allegheny and State of Pennsylvania, have invented a certain new and useful Gas and Vapor Burner, of which the following is a full, clear, and exact description, reference being had to the accompanying drawing, forming part of this specification, in which—

Figure 1:
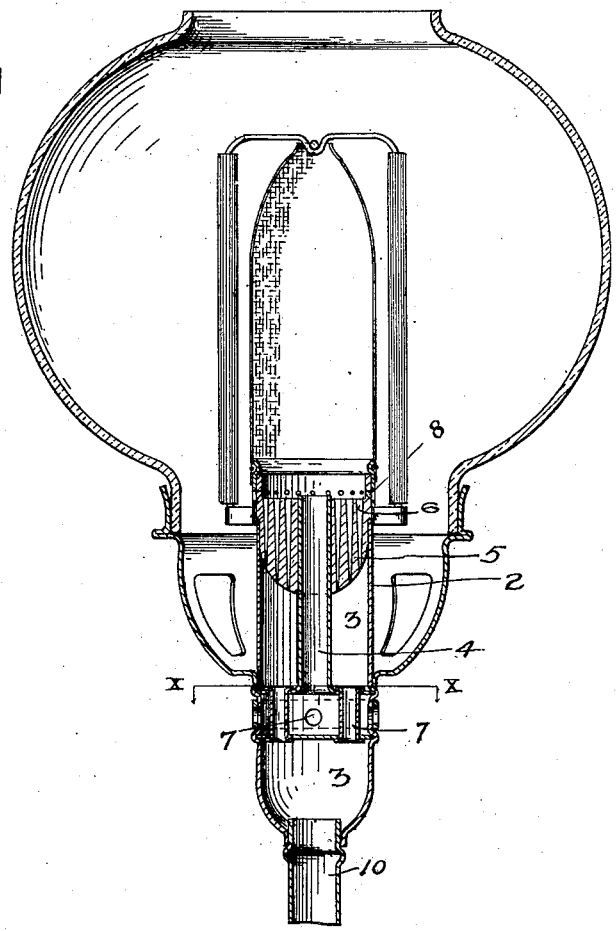
Figure 2:
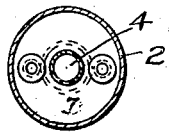
Figure 3:
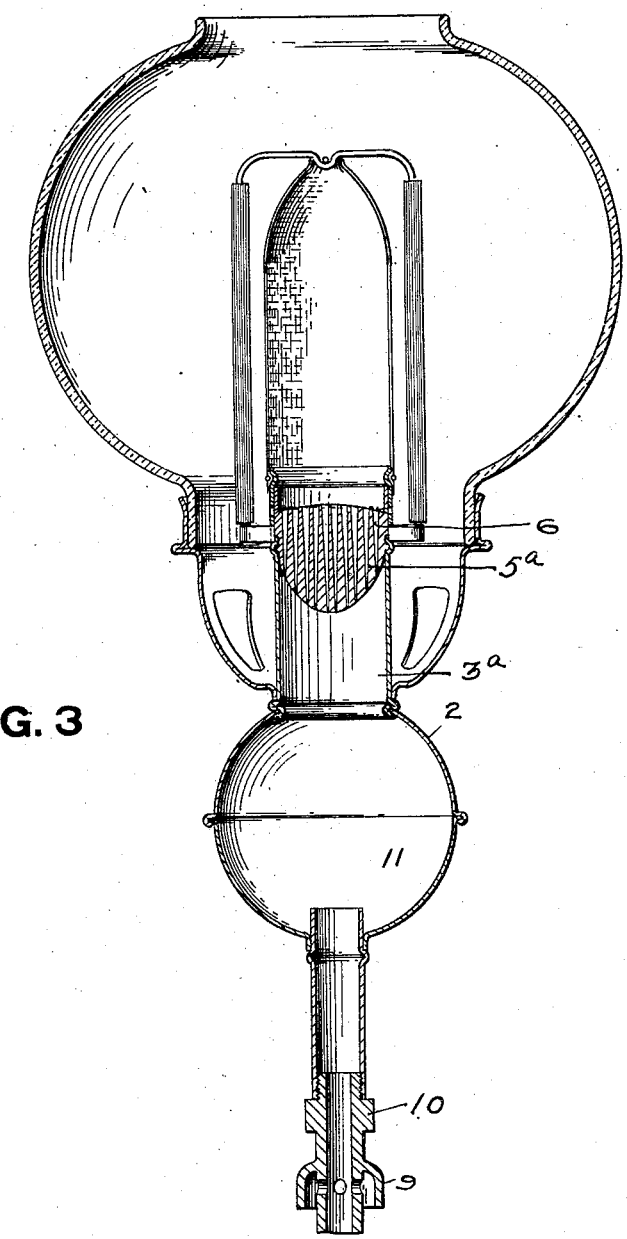
Figure 4:
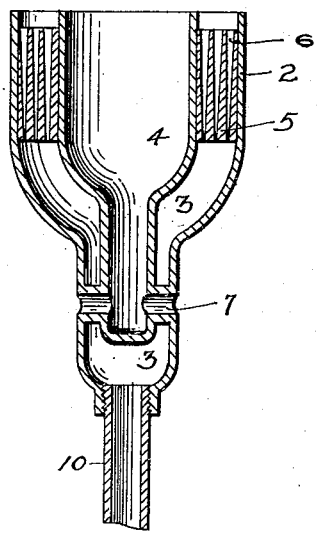
Figure 5:
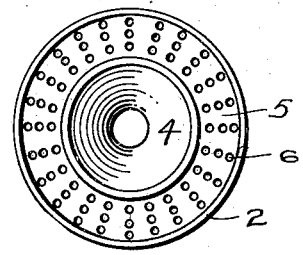
Figure 6:
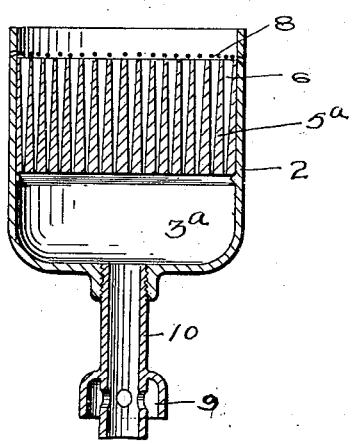

Figure 1 is a vertical sectional view illustrating my burner as provided with a mantle for producing light; Fig. 2 is a horizontal sectional view on the line X—X of Fig. 1; Fig. 3 is a vertical sectional view of a modification of the burner shown in Fig. 1; Fig. 4 is a vertical sectional view illustrating my burner and is adapted to the production of heat; Fig. 5 is a plan view of the same and Fig. 6 is a vertical sectional view illustrating a modification of the burner shown in Fig. 4.

Like symbols of reference indicate like parts wherever they occur.

My invention relates to a burner for producing light and heat and although it is especially adapted for use with gas and vapor produced from alcohol, I do not desire to limit its use to the same as it may be employed in connection with gases and vapors produced from other substances.

In the drawing, 2 represents the shell of the burner which may be formed of iron or steel or any other suitable material. Inside of the shell 2 is a gas or vapor passage 3 and 3ª which is shown in Figs. 1, 2, 4 and 5 by the symbol 3, which is annular in form, inclosing a central air passage 4. In Figs. 3 and 6 this air passage is designated by the symbol 3ª and is co-extensive with the interior cavity of the shell 2. Within the gas passage 3 and 3ª is the gas pressure regulator 5 and 5ª. This pressure regulator, as shown in Figs. 1, 4 and 5, is composed of an annular body which may be formed of lava or other suitable material having tapering perforations 6, smaller in cross-section at the base and larger at the top. In Figs. 3 and 6, this pressure regulator 5ª, instead of being annular, is cylindrical in form, the apertures 6, however, being of the same shape and character as those shown in Figs. 1, 4 and 5.

In the burner shown in Figs. 1 and 4, extending into the air tube 4 are inlet air tubes 7 which conduct the atmospheric air to the top of the burner, separated from the gas. There is therefore no mingling of the gas and air in these burners below the pressure regulator 5.

In the burners of Figs. 1 and 6, small air apertures 8 are shown directly above the gas pressure regulator 5. These small apertures are not found in the burner shown in Figs. 3 and 4.

In the burners shown in Figs. 3 and 6 an air passage 9 is located in the gas conduit 10 and in the burner shown in Fig. 3 an expansion chamber 11 is shown between the conduit 10 and the gas passage 3ª.

In the use of my burner the gas or vapor, under pressure, passes against the pressure regulator 5 where it is checked, and the gas which passes through the tapering apertures 6 is so reduced in pressure that it will burn with an even, regular flame, flashing back and roaring of the flame being prevented, and perfect combustion is insured, thus giving a maximum amount of light and heat without flickering.

Having thus described my invention, what I claim and desire to secure by Letters Patent is

1. In a gas burner, the combination of a gas passage and a gas pressure regulator comprising a series of concentrically arranged apertures which are smaller at the base and larger at the top, the upper ends of said apertures opening into the surface of the burner.

2. In a gas burner, a gas passage, a gas pressure regulator provided with concentrically arranged tapering apertures smaller at the bottom and larger at the top and opening into the surface of the burner, and an air passage separated from the gas passage and communicating with the gas passage above the gas pressure regulator.

3. In a gas burner, the combination of a gas passage and a gas pressure regulator having apertures which are smaller at the base and larger at the top distributed over the entire area of the burner, said apertures decreasing in length from the center of the burner outward.

4. In a gas burner, the combination of a gas passage, a gas pressure regulator comprising a series of concentrically arranged apertures which are smaller at the base and larger at the top, said apertures opening into the surface of the burner and a series of openings in the wall of the burner above the regulator.

5. In a gas burner, a gas passage, a gas pressure regulator provided with concentrically arranged tapering apertures smaller at the base and larger at the top, and an air passage separated from the gas passage and communicating with the gas passage above the gas pressure regulator, and a series of openings in the wall of the burner above the regulator.

In testimony whereof, I have hereunto set my hand.

WILLIAM T. SOLOMON.

Witnesses:
JAMES K. BAKEWELL,
C. E. EGGERS.